United States Patent [19]

Miles

[11] 4,047,734
[45] Sept. 13, 1977

[54] TOW BAR ASSEMBLY
[75] Inventor: Ray P. Miles, Macedonia, Ohio
[73] Assignee: Copperloy Corporation, Cleveland, Ohio
[21] Appl. No.: 660,584
[22] Filed: Feb. 23, 1976
[51] Int. Cl.² .............................................. B60D 1/14
[52] U.S. Cl. ................ 280/486; 280/491 E; 280/495
[58] Field of Search ................... 280/495, 502, 491 E, 280/486, 483, 179 A; 269/228; 74/520; 24/263 B, 263 SB, 263 LL, 263 PJ, 263 CA

[56] References Cited
U.S. PATENT DOCUMENTS

| | | | |
|---|---|---|---|
| 1,535,397 | 4/1925 | Buffington | 280/503 X |
| 2,497,351 | 2/1950 | Fletcher | 24/263 B X |
| 2,574,281 | 11/1951 | Olson | 74/520 X |
| 2,887,918 | 5/1959 | Benson | 269/228 X |
| 3,141,453 | 7/1964 | Dickey | 269/228 X |
| 3,549,174 | 12/1970 | Miles | 280/502 X |

Primary Examiner—Joseph F. Peters, Jr.
Assistant Examiner—Michael J. Forman
Attorney, Agent, or Firm—M. Ted Raptes

[57] ABSTRACT

An improved, simplified tow bar assembly adapted for towing vehicles. The assembly comprises an adjustable, spring-biased locking member adapted to be engaged on a flat portion or plate of the towed vehicle. Lever means are provided for locking the assembly against a compression spring.

1 Claim, 6 Drawing Figures

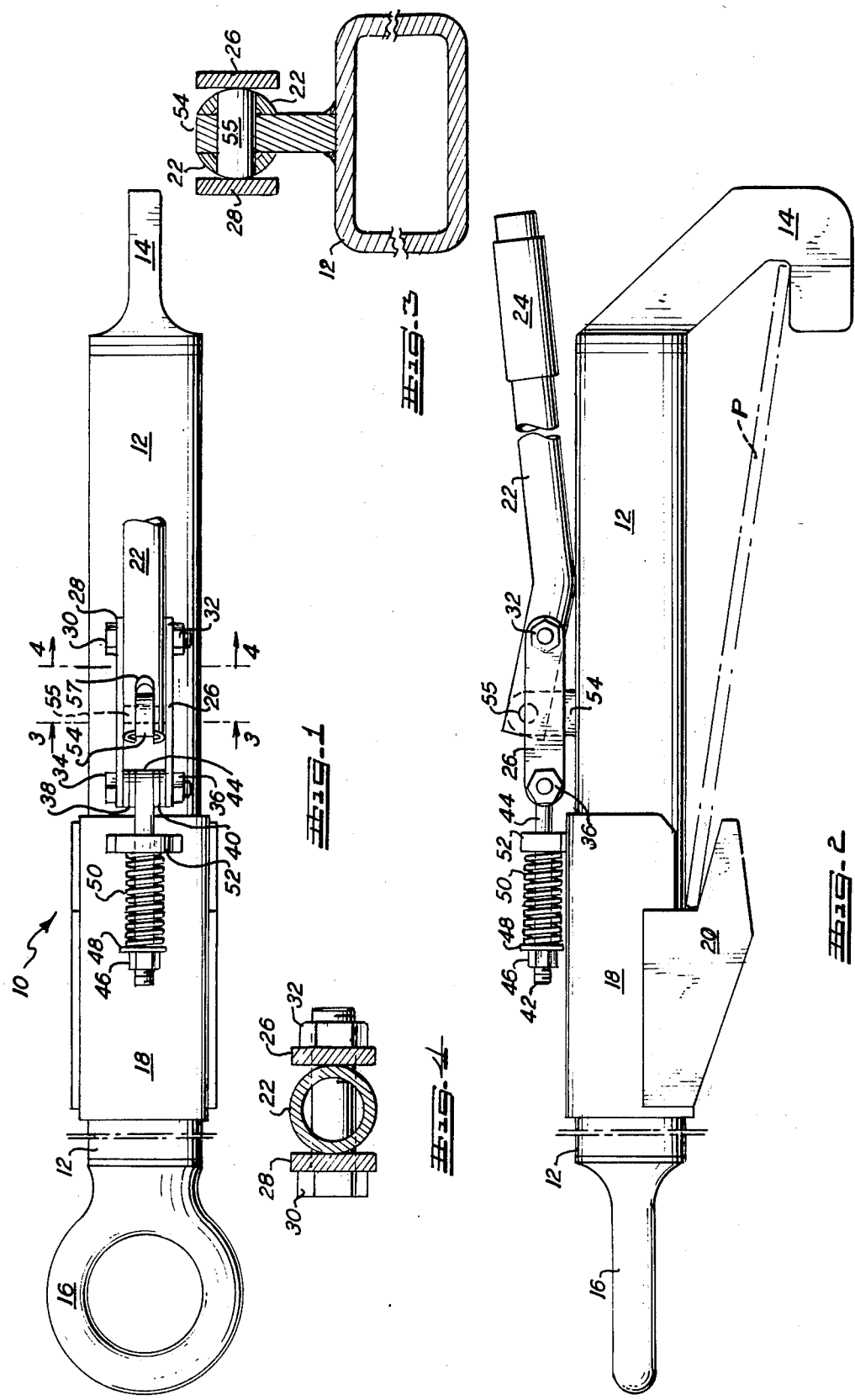

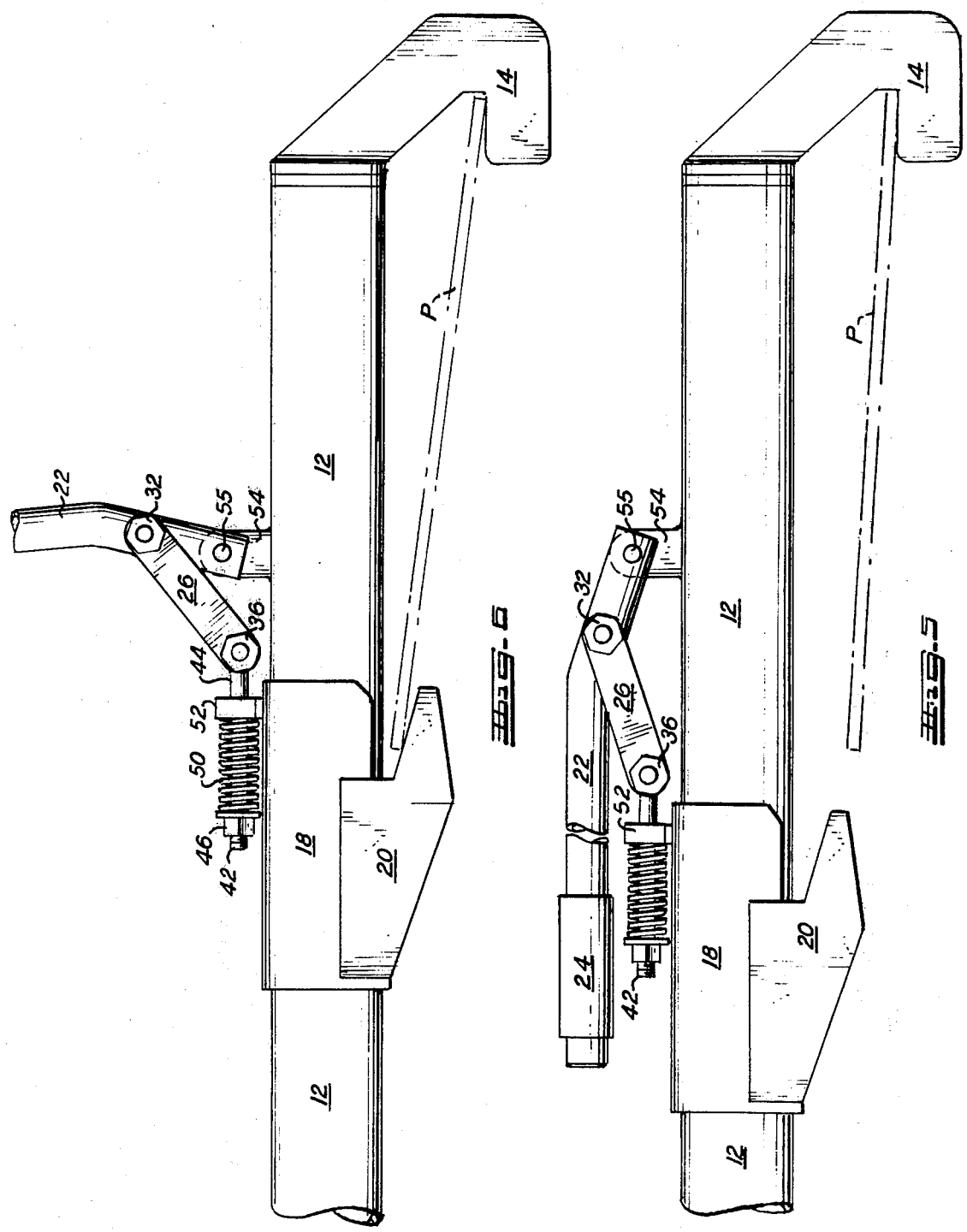

TOW BAR ASSEMBLY

BACKGROUND OF THE INVENTION

This invention relates to a tow bar assembly having an adjustable hitching device adapted to firmly engage a portion of a vehicle being towed.

In U.S. Pat. No. 3,549,174 a tow bar assembly is disclosed which comprises sliding lock means comprising jaw means and a hook means adapted to engage a flat portion or plate means of the towed vehicle. The sliding lock means is tightened against the plate means by a rotating screw and linkage assembly. Although the tow bar assembly operates satisfactorily to engage and tow the towed vehicle, the engagement is rigid. It is desirable to provide a degree of flexability in a tow bar assembly. Furthermore, in the patented assembly, the engagement operation between towing and towed vehicles is somewhat complicated by the adjustment of the rotating screw and linkage assembly of the sliding lock means.

SUMMARY OF THE INVENTION

It is an object of this invention to provide an improved tow bar assembly for engagement between a towing and a towed vehicle.

A further object of this invention is to provide an improved tow bar assembly which comprises engagement means which are easily operable and quickly engageable between the towing and towed vehicles.

A further object of this invention is to provide an improved tow bar assembly which comprises a horizontal draw bar member containing a hook member and a sliding lock member connected to lever locking means biased against a compression spring.

BRIEF DESCRIPTION OF THE DRAWINGS

FIG. 1 is a top plan view of the tow bar assembly;

FIG. 2 is a side elevational view of the tow bar assembly showing it in a locking engagement with a plate P, in phantom, which forms a part of the vehicle (not shown) being towed;

FIG. 3 is a sectional view taken along line 3—3 of FIG. 1;

FIG. 4 is a sectional view taken along line 4—4 of FIG. 1;

FIG. 5 is a side elevational view showing the initial engagement of the locking means of the tow bar assembly with a plate P, in phantom; and FIG. 6 is a side elevational view showing an intermediate position of the locking means of the tow bar assembly engaging a plate P, in phantom.

DETAILED DESCRIPTION OF THE INVENTION

Referring to the drawings, the illustrated embodiment of the tow bar assembly 10 generally comprises a horizontal draw bar 12, a tow bar hook 14, a tow bar eye hook 16, sliding lock means 18 and jaws 20, and locking lever means 22.

The draw bar 12 can be round or polygonal in cross-section, and has a tow bar hook 14 secured at the rear end thereof by suitable means adapted to engage and hook one end of a plate or flat section P on the front of the vehicle being towed. The draw bar 12 has an eye hook 16 suitably secured to the front end thereof adapted to be engaged to the rear of the towing vehicle by suitable means such as a vertical bar, clamp, etc.

The sliding lock means 18 is adapted to surround and slide along the draw bar 12 with the jaws 20 disposed underneath for engagement with plate P as will be more fully described hereinafter. Lock means 18 comprises a pad eye 52 secured to the top surface thereof. The lock means 18 can freely slide back and forth along the draw bar 12 and is limited in its movement, when engaged to plate P, by the lever means and by biasing spring means 50.

Locking lever 22 comprises hand grip 24 and one end of the lever is pivotally connected by means of pivot pin 55 to a lug 54, which is secured to the top portion of draw bar 12. The end of the lever 22 has cutout sections 57 to permit the lever end to move around lug 54. Pivot pin 55 is secured to the end of the lever 22 and passes through a hole in lug 54. The lever can be pivoted around lug 54 as shown in FIGS. 5 and 6.

A pair of parallel links 26 and 28 are pivotally connected to lever 22 a spaced distance from pivot pin 55. The links are connected to the lever by means of a cap screw 30 which passes through aligned holes in the links and the lever and secured by means of lock nut 32. The opposite ends of the links are pivotally connected to a vertical eyelet end of a rod 44. The links are connected to the eyelet by means of a cap screw 34 which passes through holes in the links and the eyelet and secured by lock nut 36. Washers 38 and 40 are inserted between the eyelet and links for spacing the links.

Rod 44 is slidably engaged in pad eye 52. A compression spring 50 is disposed around rod 44 and biased at one end against pad eye 52 and is adjustably compressed by means of washer 48 and nut 46 threaded onto the threaded end 42 of the rod 44.

The tow bar assembly is easily engaged between a towing vehicle and a towed vehicle. The eye hook 16 is connected to the rear of the towing vehicle. A flat section or plate P of the towed vehicle is initially placed between the tow bar hook 14 of the draw bar 12 and jaws 20 of the sliding lock means 18 as shown in FIG. 5. The lever 22 is pulled upwardly to a position as shown in FIG. 6 where initial engagement of the jaws 20 with the plate P is encountered. Upon complete movement of the lever to the position shown in FIG. 2, the spring is partially compressed and the plate P is secured and locked between the jaws 20 and tow bar hook 14. In this locking position the compression spring is adjusted by means of nut 46 so that the spring is not fully compressed. Accordingly, sliding lock means 18 is free to move a short distance back and forth along the draw bar 12 yet retain the plate means P within jaws 20. With this type of engagement, uneven movement, caused by bumps in a roadway, etc., between the towing and towed vehicle is absorbed by the spring.

A particular advantage of the improved tow bar assembly is the ease with which it may be engaged and disengaged between the towed and towing vehicles. Thus, it is only necessary to engage the eye hook to the towing vehicle, hook the tow bar hook 14 over the plate P on the towed vehicle, and to turn the lever 22 to engage the plate between the tow bar hook 14 and jaws 20. Disengagement simply requires turning the lever to disengage the plate. Movements between the towing and towed vehicles are provided by engagement of the tow bar eye hook 16 to the towing vehicle as well as by the compression spring as described.

From the foregoing description, of one complete embodiment of the invention, one skilled in the art can easily ascertain the essential characteristics of the invention, and without departing from the spirit and scope thereof, one can make various changes, adaptations, and modifications of the invention to adapt it to various usages and conditions.

I claim:

1. A tow bar assembly adapted to engage a flat member disposed on the forward portion of a vehicle to be towed and the back portion of a towing vehicle comprising a horizontal longitudinal bar member having eye hook means at its front end adapted to engage said back portion of said towing vehicle and first open jaw hook means at the opposite end thereof adapted to engage the rear portion of said flat member; sliding lock means adapted to travel along said bar member provided with second open jaw hook means adapted to engage the front portion of said flat member, said first and second jaw hook means disposed below said horizontal bar member, pad eye member disposed on said lock means, rod means slidably engaged in and extending through said eye member having a forwardly disposed adjustable screw member; compression spring means encircling said rod means biased between said eye member and said adjustable screw member; lever means having an end thereof pivotally disposed on lug means on said bar member; link means pivotally connected between the rear of said rod means and said lever means, said link means pivotally connected to said lever means adjacent said pivotal lever end; whereby when said eye hook means is engaged to said back portion of said towing vehicle, said first and second open jaw hook means can initially engage said flat member of said towed vehicle, and whereby said lever means can compress said spring means thereby moving said first jaw hook means firmly against said flat member, and upon adjustment of said adjustable screw member to provide flexible locking engagement of said first and second jaw hook means with said flat member.

* * * * *